(12) United States Patent
Prieto Gómez et al.

(10) Patent No.: US 7,837,786 B2
(45) Date of Patent: Nov. 23, 2010

(54) COMPOSITIONS OF CELLULAR MATERIALS THAT CONTAIN ANHYDRITE AND METHODS FOR ITS PREPARATION

(75) Inventors: Carolina Prieto Gómez, Chihuahua (MX); Jaime Valenzuela Grado, Chihuahua (MX); Armando García Luna, Monterrey (MX); Pedro Burciaga Meléndez, Chihuahua (MX)

(73) Assignee: GCC Technology and Processes S.A., Lausanne (CH)

( * ) Notice: Subject to any disclaimer, the term of this patent is extended or adjusted under 35 U.S.C. 154(b) by 587 days.

(21) Appl. No.: 11/815,022

(22) PCT Filed: Mar. 17, 2005

(86) PCT No.: PCT/IB2005/000717

§ 371 (c)(1),
(2), (4) Date: Jul. 30, 2007

(87) PCT Pub. No.: WO2006/079872

PCT Pub. Date: Aug. 3, 2006

(65) Prior Publication Data

US 2008/0141906 A1    Jun. 19, 2008

(30) Foreign Application Priority Data

Jan. 28, 2005    (MX)    .......... PA/A/2005/001125

(51) Int. Cl.
C04B 38/10    (2006.01)
(52) U.S. Cl. .................................... 106/677; 106/680

(58) Field of Classification Search ................. 106/677, 106/680
See application file for complete search history.

(56) References Cited

U.S. PATENT DOCUMENTS

| 4,233,080 | A | * | 11/1980 | Koeppel | ............... 52/612 |
| 4,300,324 | A | * | 11/1981 | Koeppel | ............... 52/612 |
| 4,900,359 | A | | 2/1990 | Gelbman | |
| 5,183,505 | A | | 2/1993 | Spinney | |
| 5,788,761 | A | | 8/1998 | Hums et al. | |

FOREIGN PATENT DOCUMENTS

| DE | 2548912 A1 | 5/1977 |
| EP | 0157760 A2 | 10/1985 |
| EP | 1081113 A1 | 3/2001 |
| FR | 865359 | 5/1941 |
| GB | 523450 | 7/1940 |
| GB | 832256 | 4/1960 |
| MX | PA03011064 A | 4/2004 |
| WO | 9301148 A1 | 1/1993 |

\* cited by examiner

*Primary Examiner*—Paul Marcantoni
(74) *Attorney, Agent, or Firm*—Rothwell, Figg, Ernst & Manbeck, P.C.

(57) ABSTRACT

The present invention describes improved cellular compositions that contain anhydrite that reaches high compression resistance values, of the order of 110 to 138 $Kg/cm^2$, as well as methods of obtaining of these. The obtained cellular materials with the compositions of the invention can be used like constructive structural materials, and without they present the problems commonly associate to the anhydrous calcium sulphate presence in similar materials.

45 Claims, 2 Drawing Sheets

Figure 1:
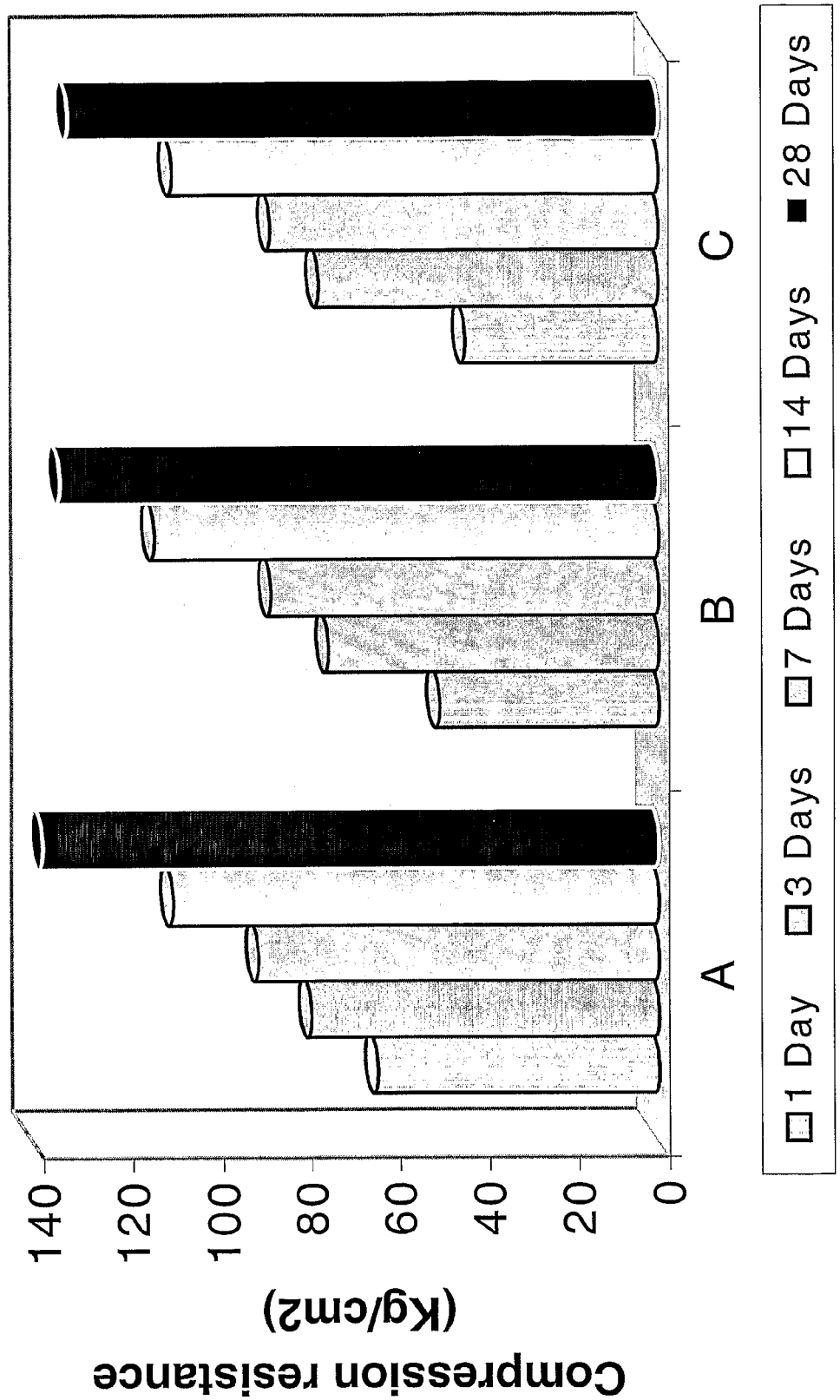

COMPOSITIONS OF CELLULAR MATERIALS THAT CONTAIN ANHYDRITE AND METHODS FOR ITS PREPARATION

CROSS REFERENCE TO RELATED APPLICATION(S)

This application is a 35 U.S.C. §371 National Phase Entry Application from PCT/IB2005/000717, filed Mar. 17, 2005, and also claims benefit to Mexican application PA/a/2005/001125 filed on Jan. 28, 2005 in which the disclosures of these applications are incorporated herein in their entirety by reference.

BACKGROUND OF THE INVENTION

1. Field of the Invention

The present invention is related to the construction field, specifically to the improved cellular cement compositions that contain anhydrite as well as their obtaining methods.

2. Description of the Related Art

The main function of a house is providing comfort to its habitants. Through years the comfort has been defined by the users as the sum of the different house's characteristics, such as the resistance of its materials, it's esthetic appearance or solidity, it's thermicity, durability, etc. For the Construction Industry there are other important aspects, such as material lightness (related to the construction rapidity, the cost of transportation, the necessity for very robust iron structures or not, etc.) the cost of materials, the durability and the user acceptance, among others.

The construction materials innovation has had to go to the rhythm of the necessities of the user; there had been tested since argillaceous materials (for thermicity) to concrete (for resistance), happening through synthetic foams (lightness and thermicity) refractory materials (thermal but expensive), wood, rigid materials with synthetic fiber hearts, etc. In this sense, the obtaining of construction materials that contain in their majority all the previous characteristics is extremely desirable.

In the last decades, there has been developing investigation in materials that include air, as much as in its composition as in their structure. These materials are known as cellular materials, since they contain infinity of cells, (opened, closed, or both) dispersed throughout its volume. The presence of these cells allows providing to the material multiple characteristics that makes it more advisable in diverse applications.

One of the most notorious characteristics of these materials, is its low density, which is considerably minor than the normal concrete repelling in a smaller weight by volume. In the case of cellular concrete, it has been managed to obtain compositions of 400 Kg/m$^3$ to 1840 Kg/m$^3$ which representing to be a lighter material than the common concrete that usually weights between 2400 to 2560 Kg/m$^3$.

The advantages of having low density materials as the cellular concrete for construction include the reduction of dead loads, more rapidity of construction and lower transportation costs, among others. One of the more direct effects in the utilization of these materials is the considerable reduction of weight that is added over the foundations of some construction, allowing the generation and design of higher constructions. Also, the use of cellular concrete allows constructive design that is not possible to make with conventional construction materials.

Another convenient characteristic of the cellular concrete is its thermal conductivity relatively low, property that improves as the density is reduced. In the last years, it has been given more importance to the necessity to reduce the consumption of fuel and energy of the system of heating of the constructions, or if it is possible, to improve the ambient to a comfortable temperature inside them. The cellular concrete constitutes an alternative that allows obtaining this effect, since for example, a solid wall of cellular concrete of smaller thickness than a brick wall, gives approximately four times bigger heat insulation.

On the other hand, this type of materials provides good noise isolation and limited water absorption.

In addition to its advantages from the technical point of view of construction, some densities of cellular concrete have the merit of including on its composition industrial plants wastes, (cellular concrete plus soft coal dregs, powdered fuel ashes and slags of high furnaces, etc.)

Nevertheless, although all advantages mentioned before, the cellular materials produced until today do not possess convenient durability characteristics to be used outdoor, because as they are more porous than the conventional construction materials, they are more vulnerable. Also these materials can suffer chemical attacks due to the contact that may have with corrosive materials, particularly sulphates, polluted environments, and reactive substances, reason for which they can't be used in exteriors or underneath terrain level of construction.

On the other hand, and although cellular concretes have favorably been applied for embankment coverings of roofs and floors providing isolation and a certain way of protection against fires, the contraction and cracking that present after setting, combined to the necessity of the use of specialized apparatuses for its obtaining, they do to cellular concretes, materials generally inadequate for its common use like constructive elements of support.

In addition, the fundamental problem that presents the development of new cellular materials is that the air inclusion in the cement mixtures with the purpose of improving his thermicity causes a considerable diminution, almost of proportional way, in the compression resistance that can develop.

Because of the anterior effects, the cellular concrete know until now can't be used as structural concrete, so it limits enormously its applications for the production of structural materials that can be useful in constructing buildings.

With the purpose of generating cellular materials with better characteristics and than they do not present/display the exposed problems, have been generated multiple solutions that try at the same time to conserve advisable compression resistance as well as the convenient characteristics that provide the cellular materials.

It's know in the construction industry that for the cellular concrete production based on the Portland cement, silica sand and lime, the air cells formation is done by generating hydrogen in the mixture from the aluminum dust reaction with an advisable reagent. Nevertheless, the obtained products with this method have poor mechanical properties and even suffer excessive contraction. This contraction, which extends by a year, is the cracking and pulverization cause that they can give rise to the destruction of the cellular material and therefore to harm of important way any area constructed with these elements. As a solution to this problem and to heighten the cellular concrete mechanical characteristics, after its partial hardening a thermal treatment is applied, generally to a 170 to 200° C. temperature and a 8 to 10 atmospheres, this process can take from 12 to 24 hours. Evidently this treatment is particularly expensive and complicated, since it requires high investments in infrastructure and in application of energy.

Because of the necessity of the autoclave treatment application to avoid the contraction of the conventional cellular material, there's been used several components in the mixtures to obtain cellular materials that avoid using completely or partly this process.

In this sense there have been obtained improved cellular concretes adding diverse chemical components to the mixtures, obtaining for example cellular materials with compression resistance to the order of 15 to 95 pounds/ft$^3$ [1]. Also with the hydrogen peroxide addition as gas generator, products of the aldehydes condensation, urea or thiourea and calcium sulphate, there have been obtained cellular materials with a density from 700 to 1000 Kg/m$^3$ and with a compression resistance of the order of 68.5 Kg/cm$^2$ [2].

By the other hand, there have been obtained stable cellular concretes that do not shrink from the substitution of a portion of cement material with industrial wastes such a oven powder (cement fines) [3].

Although previous cellular materials have been obtained by more simplified methods and have exhibited better characteristics to the compression that the traditional cellular materials, the values of compression resistance that they develop do not turn out absolutely suitable to be used like structural materials, combined to the fact that they include elements that can be toxic for the human health or animal, or for the environment.

Due to the previous thing, a main objective is to obtain an average term between resistance and volumetric weight, which assure a structural functionality for the constructor with the attractive physical and chemical characteristics of the cellular materials. As well is necessary to obtain cellular materials that develop highest compression resistance by simple processes than don't imply the usage of high quantities of energy.

BRIEF DESCRIPTIONS OF THE DRAWINGS

FIG. 1 shows a comparative graph of compression resistance of three different lots (A, B and C) of the cellular composition of the invention at 1, 3, 7, 14 and 28 days.

Figure 2:
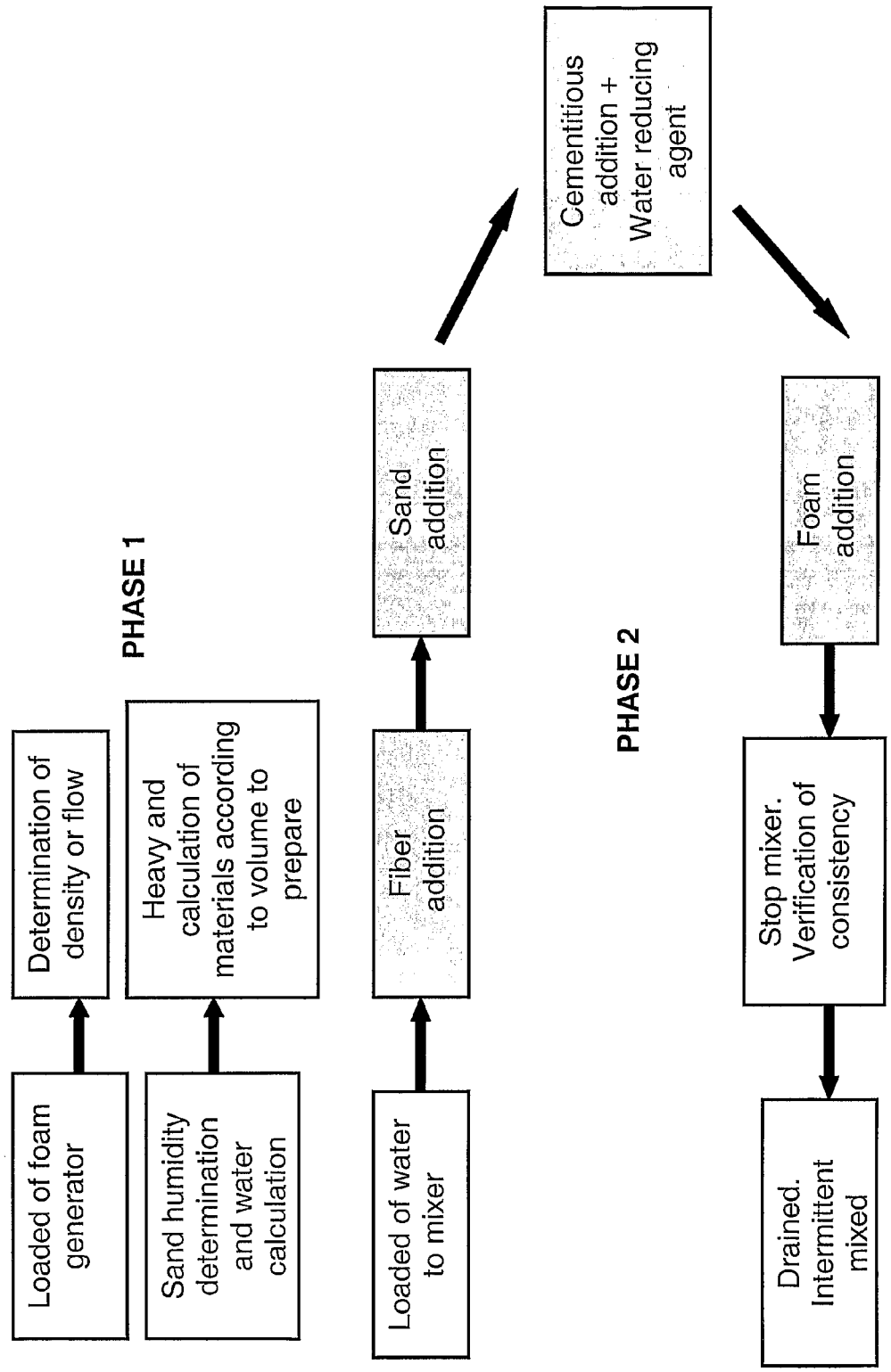

FIG. 2 shows a diagram of the process to obtaining the compositions of the invention. It distinguishes the phase 1 indicate the previous activities to the mixing and phase 2 that indicates the activities during the mixing. The dark squares indicate that in these stages the mixer is in operation.

SUMMARY OF THE INVENTION

It is an objective of the present invention to provide improved cellular cementitious compositions from mixtures of anhydrous calcium sulphate (anhydrite) and Portland cement.

Another objective of the present invention is providing cellular cementitious compositions from anhydrite and Portland cement that allow eliminating the undesired effects associated to the anhydrous calcium sulphate usage in construction materials.

Another objective of the present invention is obtaining cellular cementitious compositions not toxic to the environment and to the live beings.

It is also another objective of the present invention providing cellular cementitious compositions of low cost, with high values of compression resistance ($\geqq$110 Kg/cm$^2$) and with advisable volumetric weights for the industry of the construction ($\geqq$1200 Kg/m$^3$).

Another objective of the present invention is to provide a simple and low energy consumption method in order to obtain the cellular cementing compositions that contain anhydrite.

DETAILED DESCRIPTION OF THE INVENTION

The present invention provides compositions of cellular concrete with anhydrous calcium sulphate or anhydrite and Portland cement, that do not present the undesired effects associated to the construction materials that use calcium sulphate, and at the same time develop high compression resistance, conserving low volumetric weights that allow to use them as cellular materials advisable in the construction industry. Because of the high compression resistance that the invention compositions develops, they can be use as light structural material and at the same time provide to constructive projects all the advantages that the cellular materials provide, also because they own common properties that characterize them.

Taking advantage of the physical and chemical characteristics that the cementitious that contain calcium sulphate, like for example the development of high compression resistance, the present invention provides cellular cementitious compositions with this characteristic but they do not present the problems associated to the anhydrous calcium sulphate use.

Its know in the construction industry that the calcium sulphate and Portland cement combination allow the generation of cementitious that develop high compression resistance, how ever the physical and chemical interaction that have the components that conform this cementing materials causes undesired effects of cementing volume increase, causing its breaking, cracking and crumble. Due to just mentioned, the industry has limited in an important way the use of such mixtures, reason why the development of novel cement compositions that use calcium sulphate has seen limited.

In this sense, the adverse effects caused by the use of anhydrous calcium sulphate on cementing materials, including cellular cement materials or cellular materials obtained from them, are well known.

The addition of calcium sulphate to cellular cement mixtures during the fabrication of cellular concretes has been used with the objective to increase its crystallinity, with which increase the compression resistance and characteristics such as the contraction and the water relative content of the cellular concrete, they are affected positively[4]. The addition of the calcium sulphate in a 3.5% amount in weight, calculated as $SO_3$, along with sand, white fine lime and cement, gives as a result that the resultant compression strength increase significantly and the amount of additional cement get reduced. The calcium sulphate can be introduced to the mixture by a cement rich in sulphate, one natural anhydrite that is ground along with the cement, ashes or other advisable industrial wastes, gypsum or by the sulphuric acid addition.

Despite of the obtained benefits in the cellular material with the calcium sulphate presence, its addition generates a series of important disadvantages, because depending on the amount of calcium sulphate that is aggregated, it present cement agglomeration with the lime, generating no homogenate areas in the cellular concrete composition. This effect appears particularly when soft calcined limes are used that are very common in the construction industry, so to avoid this effect there have to be use hard calcined limes that turn out to be more expensive.

Also, the use of calcium sulphate in cellular concretes causes a delay in the hydration process of the lime, causing a considerable delay in the formation process of foam and setting, reason why the time of formation of cellular materials in molds (for example partitions, blocks, etc.) are much more prolonged. In this case the delay of the hydration of the lime cannot be compensated by rich anhydrite lime addition or by gypsum addition, since, in addition to the delay action, the soluble calcium sulphates lead simultaneously to the marked instability of the product as a result of the agglomeration.

Also, the use of calcium sulphate along with hard calcined limes to avoid the product's instability do not avoid the delay in the hardening and hydration reaction, that's why the lime being still hydrated experiments an expansion in its volume (over-growing), which affects directly the original dimension of the cellular materials finished and obtained from this mixtures. Due to just mentioned, the cellular materials can't be sold, causing lost and considerable costs to the manufacturer.

One of the options that have been use to avoid the undesired effects associated to the calcium sulphate, consist on the usage of calcium aluminate sulphate or calcium aluminate sulphate hydrated as sulphate source in partial substitution of calcium sulphate[5]. Derivate of the addition of these compounds to the cellular concrete mixtures, is avoided the agglomeration of lime in the mixing and the process foam former and setting is accelerated, as well the sulphate aggregation as ettringite or anhydrite occurs in low amounts (2 to 6% of the weight); however, this method doesn't eliminates the autoclave treatment utilization and the resultant compositions develop low compression resistance values of 25 to 30 Kg/cm$^2$, so the compositions have very limited applications.

Although cellular cementing compositions of the invention use high amounts of anhydrous calcium sulphate, surprising the events of undesirable secondary chemical agent formation that causes the observed adverse effects in other cementitious do not acquire importance, in such a way that the compositions of the invention develop high compression resistance, characteristic non obtained until now for a cellular material. That's why the cellular cementitious of the invention can be use as structural material without the associated problems of using anhydrous calcium sulphate.

The cellular cementing compositions of the invention are constituted by:
1) One cementitious constituted by a mixture of:
   a) Portland cement or clinker, and
   b) Anhydrous calcium sulphate
2) Silica sand,
3) Polyester fiber,
4) Foaming additive, and
5) Water reducing agent The cementitious that conform the cellular composition of the invention, such as is described by Garcia Luna[6], is constituted by mixture of Portland cement and anhydrous calcium sulphate, or clinker and anhydrous calcium sulphate, this last one provided to the mixture, in both cases, in form of anhydrous gypsum or anhydrite.

The anhydrite is obtained as a waste product in the industrial production of hydrofluoric acid and/or phosphorus pentoxide, or as a result of burning lime at a temperature between 600° C. and 1200° C. or well as natural anhydrite present in deposits. When considering itself the anhydrite basically as a product of industrial remainder, is not used in a direct and extensive way like the main raw material for obtaining of cementitious, situation that is taken advantage by the present invention. The direct anhydrite use in the cementitious of the composition of the invention, allows obtaining advisable cementitious at very low cost because it is not necessary to add to this raw material some previous mechanical or energy treatment to be able to occupy it.

With respect to the Portland cement, it can be use the ordinary type-1 (T1), as well for the type-3 and type-4, preferably those that have tricalcium aluminate controlled amount, being resistant to the sulphate attacks; such is the case of the type-2 (T2) and type-5 (T5) that have moderated and high resistance to the sulphates respectively; also there can be use mixtures of the diverse types of the Portland cement mentioned above. For the present invention, in the cementitious, the anhydrite and the Portland cement are in proportions in weight with respect to the total cementitious weight, between 60 to 75% of anhydrite and 25 to 40% of Portland cement, from which are preferred the ones that have an anhydrite proportion of 60% and the Portland cement proportion of 40%. Also the cementitious contains a maximum of 2% of alumina, 60% of CaO and a 38% of sulphates, that's why they are not present high level of acidity in comparison with the anhydrites obtained as subproducts, avoiding in this way elements considered toxic. Comparing the cementitious commonly used for obtaining cellular materials, the cementitious used here aren't toxic because of its low concentrations of aluminum and/or acids. This repels as well in the ecological characteristics of the cellular materials of the invention, and it allows integrating itself in an efficient way with the rest of the components of the cellular cementitious. Also, the used cementitious doesn't interfere negatively with the foaming agent or with the water reductive additive, that's why the physical and chemical effect that this element provide to the compositions of the invention is not affected. In the other hand, the characteristics of the cementitious used here for the compositions of the invention, allow the generation of multiple cells or air cavities in a very advisable way, as well as a homogenous mixing of the mixture of the cellular cementitious without taking the risks that appear very slow times of setting, as it happens with other cementitious materials with high amounts of anhydrous calcium sulphate. Also its integration with the rest of the cellular composition's components of the invention is very efficient and there is no need to apply intermittent mixed or the use of more energy in order to make it. The cementing material used in the cellular compositions of the invention, is obtained as Garcia Luna describes[6], using simple grounding and mixing procedures along of Portland cement clinker and a not fine anhydrite material, while the anhydrite fine material is being send directly to the finished product. By means of this method a fineness of mesh 325 in a 99% of particles of the obtained product is obtained like minimum.

Within the cellular composition of the invention, the cementitious previously described is present in a proportion in weight with respect to the total weight of the cellular cementitious from 40 to 70%, although those compositions that contain a proportion from 55 to 60% are more advisable, preferably those in which the proportion is from 59 to 60%.

On the other hand, the compositions of the invention have silica sand as an aggregate. Like the silica sand, the aggregates that can be used in the invention can vary extensively. It is possible to use in particular only or in mixture, silica sands of all type, silico-calcareous sands, fly ash, scoria sand, pumice stone, pozzolanic dreg or clinker, nevertheless it is preferred to use silica sand. In the invention, it's advisable to provide to the cellular mixture silica sand with a uniform particle size; although diverse sizes of particle can be used, it is preferred to use sand sifted previously by four mesh. Also the sand is present in a proportion in weight with respect to the total weight of the cellular cement from 10 to 25%, although it's preferable to use proportions of 15%.

The introduction like of fiber as one of the elements of the compositions of the invention, allows heightening improves the mechanical characteristics of the obtained cellular material. For this purpose, they turn out to be useful most of the fibers that exist in the market are useful, particularly fibers of steel, asbestos, crystal, vegetal fibers and synthetic polymer fibers such as polyamides, polyesters and polypropylenes, in a proportion in weight with respect to the total weight of the cellular cement from 0.05 to 0.08%, although it is preferable to use 0.07%. Asbestos fibers can also be used, however, asbestos is known to have detrimental health effects. Although any one of fibers previously mentioned can be used in the compositions of the invention, is preferred to use polyester fiber with a density of 1.38 g/L.

It is a common denominator in all the known cellular materials until now, the inclusion of cells or air cavities. This is made by means of varied methods, from the chemical reaction to produce the air bubbles, the synthetic foam inclusion like polystyrene (concrete lightened), until the air inclusion by means of foam made from surfactants that, when being combined with a mixture of cement and aggregates, produces a light material with very attractive thermal characteristics. In the case of the chemical methods, after the air inclusion in the mixtures and to allow an incomplete setting to form semi-solid blocks, these are put under autoclave treatment where they are cured with steam to evaporate the surplus water in pores, being generated the air cells in the material. Independently of the method that is used, the inclusion of cells or air spaces in the cellular materials contributes in an important way to the appearance of the typical characteristics of the material.

Unlike the inclusion of air cells by means of chemical methods, the present invention uses foaming additives that allow of controlled and safe way the foam generation in the mixture, with the consequent inclusion of air and later formation of cells in the same one. Although the chemical methods of air inclusion in cementitious mixtures have proven to be efficient, elements such as the aluminum that regularly are present in such cementitious, causes adverse effects in the chemical reactions that generate air; also regularly is necessary the autoclave treatment to generate the cellular materials to be occupied by the constructor. The present invention avoids the use of such chemical agents and completely eliminates the use of the autoclave treatment to generate the characteristics of the material.

Due to the use of foaming additives in the compositions of the invention, the size of the formed cells in the material can be regulated in a simple and advantageous way. In the invention, a great amount of existing foaming additives in the market can obtain the wished effect, like for example saponins or any advisable synthetic surfactant like for example butoxyethanols, although it is preferred to use 2-butoxyethanol, that can be acquired under name of some trade names, as for example the mark Mearcell 3532 of the Cellular Concrete LLC Company.

The amount of foaming additive that is used in the compositions of the invention is in a proportion in weight with respect to the total weight of the cellular cementitious from 0.01 to the 0.02%, although it's preferable to use proportions of 0.013%. The presence of the surfactant in the mixture diminishes the size of the cells, reason why depending on the size that is desired in the mixture, the foaming additive can be used in the indicated minimum proportions indicated previously.

The foam that is added to obtain the cellular compositions of the invention is obtained from a foam generator, basically mixing foaming additive and water in a proportion in volume of 1:40 additive-water and is extremely desirable that has a density from 27 to 30 g/L.

The water reducing agent present in the invention compositions allows reducing the water content in the mixture in an important way conserving the same fluidity. This way the amount of water used in the mixture is reduced, diminishing with it the costs and infrastructure associated to the water handling and it's later mixed with the solid elements of the mixture to reduce the contraction in the drying process. The use of these reducing agents allows faster drying to harden and to obtain improved mechanical characteristics of the cellular material. For the purposes of the invention, the reducing agents that can be used are selected from the group that consists of resins of low molecular weight that contains sulfonate groups such as polystyrene sulfonate of low molecular weight, condensed of formol with naphthalene with low molecular weight, phenol, urea, or melamine, with sulfonate groups, and polycarboxylate polymers, like for example Glenium 3000NS of the Degussa Company; nevertheless those polycarboxylate polymers and very particularly Glenium 3000NS are preferred.

The amount of reducing agent that is used in the compositions of the invention is in a proportion in weight with respect to the total weight of the cellular cementitious from 0.1 to 0.2%, although it's preferable to use proportions of 0.13%.

The water used to mix the compositions' ingredients of the invention, is in a proportion in weight with respect to the total weight of the cellular cementitious from 20 to 30%, although it's preferable to use proportions of 25%. Also it can have a smaller value of pH 6 and to contain some dissolved ingredients, like for example sulphates, which are preferred to be at most in 3000 ppm (measured like $SO_4^{-2}$).

The compositions of the invention can be obtained by simple mixing procedures and gradual addition of each of their constituting elements mentioned above. The elements can be added in a conventional mixer with sufficient volumetric and mechanical capacity depending of the desired quantity to obtain, in such way that the mixing is continuous and enough to generate the compositions of the invention. Although the elements that conform the compositions of the invention can be added of joint way, is preferred to add the elements to different times as its show in FIG. 2. Initially water and fiber are mixed during the sufficient time to obtain a homogenous mixture, preferably during 1 minute. Later and without letting mix continuously, the sand, cementitious and water reducing additive and the foam are added in this order, mixing by 1 minute between the addition of each one of these elements.

Finished the mixing process, the resulting mixture can be placed in molds allowing its setting at room temperature to obtain constructive cellular materials of diverse forms or sizes, or to be applied in a direct way in the site where it will be used. The obtained cellular materials can be cut in forms wished for the production of the final product using advisable devices. Unlike the known conventional cellular materials that need to be put under steam in autoclave so that they can develop their physical characteristics completely, the obtained cellular materials with the compositions of the invention do not need autoclave treatment, which allows to a considerable saving of time and costs in its obtaining. After their setting to room temperature, the obtained constructive cellular materials with the compositions of the invention can be packed and be transported to the sites where they will be used.

Also and before their setting, the compositions of the invention can easily be applied with the ordinary tools of application of plaster to habitual surfaces, such as brick walls, cardboard, block, plaster or metal, having good characteristics of union to them and without appearing the application disadvantages that commonly exist with the application of plasters. Finally the obtained cellular material is lighter than ordinary gypsum due to its cellular nature.

A grate part of the known cellular materials until now, cannot be used outdoors, reason why they have been used mainly in interiors where the use conditions do not require a high degree of resistance to the water.

The compositions of the invention are particularly applicable in the elaboration of cellular materials, such as panels, blocks or other construction equipments prefabricated of low density and greater compression strength. Also, the compositions of the invention differ from other similar well-known products due to the development of a greater compression resistance, of the order of at least of 110 Kg/cm$^2$ to the 14 days and greater to 130 Kg/cm$^2$ to the 28 days, which allows its use like structural material in constructions. On the other hand their properties of improved resistance are added to other characteristics, such as a uniformity in the mixture and in the cellular structure, which repels in the rest of the physical characteristics of the obtained cellular material in the invention.

The characteristics of this material make it very attractive to different interest groups, because:
- Is thermal, due to the inclusion of more 32% of air by volume.
- Is resistant, due to the characteristics of the cementitious used, which allows using it like structural material, unlike most of the commercial cellular materials.
- Is solid to the tact, characteristic looked for a very important segment of the industry of the construction.
- Is light, since weights approximately the half of the normal concrete, making easy its transportation and manipulation.
- It can be easily cut with saw.
- Unlike the normal concrete, is easy to introduce nails in walls elaborated with this material.
- Is liquid in the mixing, which allows the strained of capricious forms without the necessity of vibrated.

The uses are very varied, from small elements prefabricated like bricks, panels, blocks, to more complex structures as architectonic forms, prefabricated houses and mines, and with application also in fillings of floors, pipes, etc.

Like common cellular concrete, when using the cellular materials of the invention in the constructions, minors run times in the works are obtained that if traditional materials were used; for that reason, the use of such cellular materials instead of common bricks to execute a same area of wall, takes particular relevance.

In comparison with most of the construction materials such as the annealed mud brick, where the transport of such is limited by its weight, not by its volume, the cellular materials of the invention can be handled in economic form in volumes much greater with devices or common systems of transport for conventional cellular materials.

Unlike the compositions of the invention, the compositions obtained from fresh foaming ordinary gypsum mixtures (like a calcium sulphate source) and water, independently if they are prepared chemical or mechanically, they are very inadequate to be used with conventional tools of application of plaster, since the fine gel consistency that they develop, slips easily of the tools and it only adheres with difficulty to the brick and other surfaces where they are applied. For that reason, it is very difficult to form thick films with these mixtures and the dry products often give only one weak and dusty surface. The cellular compositions of the invention eliminate these effects when using cementitious with high anhydrite content as anhydrous calcium sulphate source altogether with other elements to obtain much more advisable cellular mixtures.

According to as it Koeppel describes, the anhydrite also has been used by itself like calcium sulphate source in the generation of cellular materials[7], altogether with dust of aluminum and oxides or hydroxides of alkaline earth metals that work like catalysts of anhydrite setting and agents able to react with pulverized aluminum to form hydrogen. Derivative of these mixtures has been obtained cellular material with a compression resistance of 24 bars after 28 days. Nevertheless when water reducing agents add themselves in these mixtures to improve their mechanical properties, these interfere in an important way in the chemical reaction of hydrogen production for the generation of air cells, doing it slower, reason why the formation of air cells is incomplete; the same effect of interference appears when the reaction happens in low temperatures.

Unlike the described by Koeppel, although the compositions of the invention contain anhydrite in the cementitious material in important amounts, these do not present the effect of interference with the foaming agent, reason why the air cells form of complete and efficient way. Also and because it is not necessary to use catalytic agents of setting in the compositions of the invention, these do not interfere negatively in their obtaining; on the other hand, when eliminating the use of aluminum compounds, the cellular cementitious of the invention are completely compatible with the environment and life beings, reason why this material is not polluting.

Although cellular cementitious include calcium sulphate could have been obtained with considerable compression resistance, as it describes Boris[8], these have been obtained from soluble anhydrite or from hemihydrated calcium sulphate in granular cellular particle form in high percentage in the compositions (less of 80%). In this case the size of particle of the originating finest material of the calcium sulphate source is of mesh 200 in 60/80% and in the not finest material it is of mesh 52 in not more of 3%. Along with the calcium sulphate source setting accelerators are added (mixtures of potassium sulphate, zinc sulphate and aluminum sulphate), amounts from the 0.5 to 3% of hydrated lime (calcium hydroxide) or of calcium oxide to the mixture, and until a 5% of Portland cement as a substitute of the lime and as an additive in the stage of foam production to reduce viscosity. These materials are added in the stage of foam generation, in the stage of packing or in the site of application of the material. The cellular materials described by Boris are obtain by means of conventional mixture with water being generated a humid material that is let dry later to calcine it in a furnace to 150° C. Later the finest material of mesh 100 is removed, obtaining finally the cellular material. The described mixtures previously reach advisable volumetric weights of 1000 to 1200 Kg/m$^3$, and compression resistance values generally low from 17 to 53 Kg/cm$^2$. Although these compositions are able to reach values of compression resistance from 120 to 140 Kg/cm$^2$ in some cases, it is necessary to use specific conditions in the calcination process and to even use equipment to treat the material by autoclave. This implies the use of a greater amount of energy, of time of process and specialized equipment for the obtaining of this type of materials.

Unlike the process of obtaining of the cellular material described by Boris, the process of the invention does not use calcination or autoclave treatment of the obtained material, to activate the physical properties of the cellular cementitious, or to dry the obtained cellular products from the cementitious, with which important savings are obtained in the infrastructure use and in the use of energy for their obtaining; also the use of expensive equipment and heavy handling is eliminated of important way. On the other hand, the process of the invention allows to obtain from simple and efficient way, cellular cementitious with improved physical properties in considerably smaller times in comparison with the process described by Boris or by other conventional methods to obtaining cellular materials. Also the cellular cementitious compositions described by Boris, contain undesirable elements for the formation of air cells in the mixture, such as aluminum compounds like setting accelerators and use considerable amounts of water in their composition, which makes difficult the mixed of the components and extends the time of autoclave treatment of obtained products; on the other hand, the hemihydrated calcium sulphate or soluble anhydrite use like fundamental raw material of these compounds, reduces the access to the raw material due to the limitations that exist in their generation. Finally, unlike the present invention, Boris does not report nor suggests the anhydrous calcium sulphate use with other elements for the production of cellular materials that develop high compression resistance and which they can be used like structural materials.

Like the known cellular material, the obtained cellular materials with the compositions of the invention are lighter in weight than the ordinary systems and than dry plaster. Also they are useful to produce prefabricated constructive units such as blocks or slabs for the heat insulation and these materials can be molded to the wished forms before the fresh mixtures begin to set and to become hardened.

The cellular compositions of the invention allow to generate cellular materials that reach high compression resistance, without they present the undesirable effects that are caused by the calcium sulphate source in other materials, such as the agglomeration, the delay in the reaction of the hydratation and the over growth of the material.

The following examples are shown like a way to illustrate the present invention, without limiting its scope.

Example 1

Obtention of the Anhydrite-Portland Cement Cementitious

The cementitious was obtained by the process described by García Luna[6]. Anhydrous gypsum from the process of hydrofluoric acid obtaining (HF) as remainder product, were fed directly on a fines separator; the resulting retained material was ground together with clinker of Portland cement in an industrial mill during 1 hour in presence of a milling additive. Finally the resulting product was mixed with the anhydrous gypsum fines that were separated previously to the grounding.

For obtaining the wished cementitious, the proportions in weight of each one of their components were previously determined before their joint milling.

The obtained cementitious presented a fineness of mesh 325 in a 99% like minimum and the characteristics shown in table 1.

TABLE 1

| COMPONENTS | AMOUNT | METHOD |
| --- | --- | --- |
| $SiO_2$ [%] | 9-10 | ASTM-C114 |
| $Al_2O_3$ [%] | 2 maximum | ASTM-C114 |
| $Fe_2O_3$ [%] | 1.1-1.3 | ASTM-C114 |
| CaO [%] | 50-52 | ASTM-C114 |
| MgO [%] | 0.2 maximum | ASTM-C114 |
| $K_2O$ [%] | 0.3 maximum | ASTM-C114 |
| $Na_2O$ [%] | 0.2 maximum | ASTM-C114 |
| $SO_3$ [%] | 34-38 maximum | ASTM-C114 |
| Free lime [%] | 0.3 | ASTM-C114 |
| LOI [%] | 1 maximum | ASTM-C114 |
| Mesh 325 [%] | 99 minimum | ASTM-C430 |
| Blaine (g/cm$^2$) | 7000 minimum | ASTM-C204 |
| Initial time of setting (min) | 20-25 | ASTM-C191 |
| Final time of setting (min) | 48-55 | ASTM-C191 |
| 24 hrs. resistance (Kg/cm$^2$) | 85 minimum | ASTM-C109 |
| 3 days resistance (Kg/cm$^2$) | 135 minimum | ASTM-C109 |
| 7 days Resistance (Kg/cm$^2$) | 180 minimum | ASTM-C109 |
| 28 days resistance (Kg/cm$^2$) | 250 minimum | ASTM-C109 |
| Expansion in autoclave [%] | 0.11 maximum | ASTM-C151 |

Example 2

Obtaining of the Cellular Cementitious of the Invention

In a generating foam tank equipped with filling valves and a compressor, foaming additive and water in a proportion in volume 1:40 additive:water were added through the valves.

The air was added later to the generator by a compressor until reaching a pressure between 7 and 9 bars, until generating foam with a density between 27 and 30 g/L.

On the other hand, considering the water contained in the silica sand, the necessary water was loaded to the tank of mixer with a vanes light-striped type to which the fiber with the mixer in operation was added later, mixing during a minute. Without stopping the mixer, the silica sand was added to the mixture (to see table 2) previously sifted by mesh 4, and it was mixed again during a minute; next the cementitious was added to the mixture and approximately at the half of the load of this one, the reducing water additive was added.

When finishing draining the cementitious, the mixing was allowed by two more minutes and there was added the advisable amount of foam previously generated to the mixture, by direct way or through flow.

The resulting mixture was homogenized by agitation during 1 minute until it acquired a good consistency and the foam was incorporated completely.

Finally the mixing stopped and the cementitious cellular composition was drained, either in molds for the obtaining of cellular materials for the construction, or in the site of its application.

TABLE 2

| | COMPONENT | AMOUNT | METHOD |
| --- | --- | --- | --- |
| Chemical composition | $SiO_2$ [%] | 81.5 minimum | ASTM-C114 |
| | $Al_2O_3$ [%] | 9.6 maximum | ASTM-C114 |
| | $Fe_2O_3$ [%] | 1.2 maximum | ASTM-C114 |
| | CaO [%] | 1.6 maximum | ASTM-C114 |
| | MgO [%] | 0.9 maximum | ASTM-C114 |
| | $SO_3$ [%] | 0.1 maximum | ASTM-C114 |
| | $K_2O$ [%] | 2.7 maximum | ASTM-C114 |
| | $Na_2O$ [%] | 2.5 maximum | ASTM-C114 |
| Granulometric distribution | Mesh 6 | 0.1-0.4 | NMX-C-077 |
| | Mesh 8 | 0.5-1.0 | NMX-C-077 |
| | Mesh 16 | 4.0-4.7 | NMX-C-077 |
| | Mesh 30 | 8.8-17.2 | NMX-C-077 |
| | Mesh 50 | 39.5-53.3 | NMX-C-077 |
| | Mesh 80 | 18.6-30.7 | NMX-C-077 |
| | Mesh 100 | 3.3-4.6 | NMX-C-077 |
| | Fines | 4.6-6.8 | NMX-C-077 |

The table 3 shows the amounts used for the obtaining of 1 m$^3$ of cellular compositions of the invention, as well as the proportions in weight and volume of each one of their components. As it can be observed, at least 70% of the total weight of the composition are conformed by the cementitious and the silica sand, while at least 32% of the total volume of the cellular composition, is occupied by air, including by means of the preformed foam.

TABLE 3

| MATERIAL | A Kg* | A % weight** | A % vol*** | B Kg* | B % weight** | B % vol*** | C Kg* | C % weight** | C % vol*** | D Kg* | D % weight** | D % vol*** |
|---|---|---|---|---|---|---|---|---|---|---|---|---|
| Cementitious† | 800 | 58.1 | 26.3 | 531.8 | 40 | 17 | 599.6 | 45.7 | 20 | 599.6 | 45.4 | 20 |
| Silica Sand | 202 | 14.7 | 8.2 | 531.8 | 40 | 22 | 433.5 | 33.1 | 18 | 433.5 | 32.8 | 18 |
| Water | 340.4 | 24.7 | 34 | 226 | 17 | 23 | 235.2 | 17.9 | 24 | 245.4 | 18.6 | 25 |
| Fiber | 0.68 | 0.05 | 0.1 | 0.63 | 0.05 | 0.01 | 0.63 | 0.05 | 0.01 | 0.63 | 0.05 | 0.01 |
| Water reducing additive | 1.5 to 1.8 | 0.13 | 0.2 | 1.4 to 2.0 | 0.11 | 0.01 | 1.5 to 2.0 | 0.11 | 0.01 | 1.5 to 2.0 | 0.11 | 0.01 |
| Air | 31.7 | 2.3 | 32 | 38 | 2.86 | 38 | 39 | 2.97 | 39 | 38 | 2.88 | 38 |
| Foaming additive | 0.18 | 0.01 | 0.01 | 0.18 | 0.01 | 0.01 | 0.18 | 0.14 | 0.01 | 0.18 | 0.14 | 0.01 |
| Total | 1377 | 100 | 100 | 1330 | 100 | 100 | 1311 | 100 | 100 | 1320 | 100 | 100 |

*For 1 m³
**With respect to the total weight of the composition.
***With respect to the total volume of the composition.
†In proportion in weight 60:40 anhydrite:cement Portland.

Example 3

Physical Characteristics of the Cellular Cementitious of the Invention

After the drained in cylindrical molds and later setting, the obtained cellular cementitious in example 2 was put under different tests from determination of physical characteristics, including the compression resistance, as well as the volumetric weight developed by the material on the basis of the norm. An example of the properties of one of the obtained compositions of the invention is shown in table 4.

TABLE 4

| | COMPONENT | AMOUNT | METHOD |
|---|---|---|---|
| Properties of the humid mixture (without setting) | Volumetric weight (Kg/m³) | 1300-1380 | ASTM-C29 |
| | pH | 11-12 | ASTM-C4972 |
| | Extensivity (mm) | 620 minimum | ASTM-C143 |
| | Air included [%] | 31-39 | NMX-C-157 |
| | Initial time of setting (min) | 40 minimum | ASTM-C191 |
| Properties of the hard mixture | Compression resistance 24 hrs (Kg/cm²) | 35 minimum | ASTM-C39 |
| | Compression resistance 3 days (Kg/cm²) | 50 minimum | ASTM-C39 |
| | Compression resistance 7 days (Kg/cm²) | 60 minimum | ASTM-C39 |
| | Compression resistance 28 days (Kg/cm²) | 120 minimum | ASTM-C39 |
| | Dry volumetric weight (Kg/m³) | >1200 <1320 | ASTM-C29 |
| | Rupture module 28 days (Kg/cm²) | 12 minimum | ASTM-C78 |
| | Elastic module 28 days (Kg/cm²) | 53.000 minimum | ASTM-C469 |
| | Expansion in autoclave [%] | 0.04 maximum | ASTM-C151 |
| | Fire resistance (hrs.) | 4 | ASTM-E119 |

The obtained results, that in the different elaborated lots of test show good behavior, are observed in FIG. 1. As it can be observed, the compression resistance developed by the cellular cementitious of the invention when the cementitious anhydrite:Portland cement in proportion 60:40 was used, reached minimum values from 87 to 90 Kg/cm², 109 to 113 Kg/cm² and from 132 to 138 Kg/cm² at 7, 14 and 28 day corresponding. Also the determined volumetric weight reached values equal or greater to 1200 Kg/m³. As it can be observed, the values of compression resistance and volumetric weight that develop the cellular compositions of the invention, fulfill with the minimum physical properties waited for structural constructive elements and according to different designs from construction, as well with the own characteristics of the cellular materials.

REFERENCES

1. Spinney, Stewart C. 1993. Cellular concrete. U.S. Pat. No. 5,183,505.
2. Improvements in or relating to water-setting plasters and cements. 1940. GBPat 523450.
3. Gelbman, Lawrence F. 1990. Cellular concrete. U.S. Pat. No. 4,900,359.
4. Clementi, Franz. 1968. Procedimiento para la fabricación de hormigón de gas, endurecido por medio de vapor. ESPat 352719.
5. Hums, Dieter. 1998. Process for the manufacture of construction materials. U.S. Pat. No. 5,788,761.

6. García Luna, Armando. 2003. Composiciones cementantes que contienen anhidrita y procedimiento para su fabricación. Solicitud de patente MX No. 2003-011064.
7. Koeppel, Robert. 1980. Anhydrite cellular concrete and composite building elements. U.S. Pat. No. 4,233,080
8. Boris Taylor, John. 1960. Improvements in or relating to cementitious material. GBPat 832256.

The invention claimed is:

1. A cellular cement composition, comprising:
 a) a cement composition comprising a mixture of:
  Portland Cement in a percentage in weight with respect to the total weight of the cement composition from 25 to 40%, and
  Anhydrite in a percentage in weight with respect to the total weight of the cement composition from 60 to 75%,
 b) Water,
 c) Sand,
 d) Fiber,
 e) a foaming additive and
 f) a water reducing agent,
wherein said foaming additive generates foam when mixed with water.

2. The cellular cement composition of claim 1, wherein the cement composition of a) is in a percentage in weight with respect to the total weight of the cellular cement composition from 40 to 70%.

3. The cellular cement composition of claim 1, wherein the water is in a percentage in weight with respect to the total weight of the cellular cement composition from 20 to 30%.

4. The cellular cement composition of claim 1, wherein the sand is in a percentage in weight with respect to the total weight of the cellular cement composition from 10 to 25%.

5. The cellular cement composition of claim 1, wherein the fiber is in a percentage in weight with respect to the total weight of the cellular cement composition from 0.05 to 0.08%.

6. The cellular cement composition of claim 1, wherein the foaming additive is in a percentage in weight with respect to the total weight of the cellular cement composition from 0.01 to 0.02%.

7. The cellular cement composition of claim 1, wherein the water reducing agent is in a percentage in weight with respect to the total weight of the cellular cement composition from 0.1 to 0.2%.

8. The cellular cement composition of claim 2, wherein the cement composition in a) is in a percentage in weight with respect to the total weight of the cellular cement composition from 55 to 60%.

9. The cellular cement composition of claim 8, wherein the cement composition in a) is in a percentage in weight with respect to the total weight of the cellular cement composition from 59 to 60%.

10. The cellular cement composition of claim 9, wherein the sand is in a percentage in weight with respect to the total weight of the cellular cement composition of 15%.

11. The cellular cement composition of claim 10, wherein the water is in a percentage in weight with respect to the total weight of the cellular cement composition of 25%.

12. The cellular cement composition of claim 11, wherein the fiber is in a percentage in weight with respect to the total weight of the cellular cement composition of 0.07%.

13. The cellular cement composition of claim 12, wherein the foaming additive is in a percentage in weight with respect to the total weight of the cellular cement composition of 0.013%.

14. The cellular cement composition of claim 13, wherein the water reducing agent is in a percentage in weight with respect to the total weight of the cellular cement composition of 0.13%.

15. The cellular cement composition of claim 1, wherein the Portland cement is in a percentage in weight with respect to the total weight of the cement composition of 40% and the anhydrite is in a percentage in weight with respect to the total weight of the cement composition of 60%.

16. The cellular cement composition of claim 15, wherein the Portland cement is provided in a clinker form.

17. The cellular cement composition of claim 16, wherein the Portland cement is selected from the group consisting of type-1, type-2, type-3, type-4 and type-5.

18. The cellular cement composition of claim 17, wherein the cement composition in a) consists of:
 g) sulfates in a percentage in weight with respect to the total weight of the cement composition in a) of no greater than 38%,
 h) CaO in a percentage in weight with respect to the total weight of the cement composition in a) of no greater than 60%, and
 i) Alumina in a percentage in weight with respect to the total weight of the cement composition in a) of no greater than 2%.

19. The cellular cement composition of claim 18, wherein the cement composition in a) has a mesh fineness of 325 in a 99%.

20. The cellular cement composition of claim 19, wherein the sand has a particle size of four mesh.

21. The cellular cement composition of claim 20, wherein the sand is selected from the group consisting of silica sand, silico-calcerous sand, scoria sand, pumice stone or puzzolanic dreg.

22. The cellular cement composition of claim 21, wherein the sand is silica sand.

23. The cellular cement composition of claim 22, wherein the fiber is in a percentage in weight with respect to the total weight of the cellular cement composition of 0.05%.

24. The cellular cement composition of claim 23, wherein the fiber is selected from the group consisting of steel fiber, crystal fiber, vegetal fiber and synthetic polymer fiber.

25. The cellular cement composition of claim 24, wherein the synthetic polymer fiber is selected from the group consisting of polyamides, polyesters and polypropylenes.

26. The cellular cement composition of claim 25, wherein the fiber is polyester.

27. The cellular cement composition of claim 26, wherein the fiber has a density of 1.38 g/L.

28. The cellular cement composition of claim 27, wherein the foaming additive is selected from the group consisting of saponins or synthetic surfactants.

29. The cellular cement composition of claim 28, wherein the synthetic surfactant is butoxyethanol.

30. The cellular cement composition of claim 29, wherein the butoxyethanol is 2-butoxyethanol.

31. The cellular cement composition of claim 30, wherein the water reducing agent is a polymer selected from the group consisting of polystyrenes with sulfate groups, condensed of formol with naphthalene, phenol, urea or melamine with sulfate groups and polycarboxylate polymers.

32. The cellular cement composition of claim 30, wherein the water reducing agent is a polycarboxylate polymer.

33. The cellular cement composition of claim 30, wherein the water contains 3000 ppm of sulfates at the most and pH less than 7.

34. The cellular cement composition of claim 33, wherein said cellular cement composition develops a minimum compression resistance of 113 Kg/cm² and 130 Kg/cm² at 14 and 28 days respectively.

35. The cellular cement composition of claim 33, wherein it has a minimum volumetric weight of 1200 Kg/m³.

36. A method for obtaining cellular cement compositions of claim 1, comprising:
   a) Combining a foaming additive with water to generate foam,
   b) Mixing water with fiber,
   c) Adding sand to the mixture obtained in b),
   d) Adding a cement composition comprising a mixture of Portland cement in a percentage in weight with respect to the total weight of the cement composition of from 25 to 40%, and anhydrite in a percentage in weight with respect to the total weight of the cement composition of from 60 to 75% altogether with a water reducing agent, to the mixture obtained in c), and
   e) Adding the foam obtained in a) with the mixture obtained in d).

37. The method of claim 36, wherein the proportion in volume of the water and the foaming additive is 1:40 respectively.

38. The method of claim 36, wherein the foam has a density from 27 to 30 g/L.

39. The method of claim 36, wherein the mixing of the components is continuous.

40. The method of claim 36, wherein after the addition of each one of the components, it is mixed for one minute.

41. The method of claim 36, wherein the mixing of the components is made at room temperature.

42. The method of claim 36, wherein the anhydrite is a remainder of the industrial hydrofluoric acid production.

43. A constructive cellular material that contains the cellular composition of claim 1, wherein it has a minimum compressive strength of 113 Kg/cm² and 130 Kg/cm² at 14 and 28 days respectively.

44. The cellular material of claim 43, wherein it is in brick form.

45. The cellular material of claim 43, wherein it is in form of panel or block.

* * * * *